US010954983B2

(12) United States Patent
Carper et al.

(10) Patent No.: US 10,954,983 B2
(45) Date of Patent: Mar. 23, 2021

(54) WEIGHT-TRIGGERED LOCKING FEATURE

(71) Applicant: Raytheon Company, Waltham, MA (US)

(72) Inventors: Brent A. Carper, Tucson, AZ (US); Mitchell H. Parker, Vail, AZ (US)

(73) Assignee: Raytheon Company, Waltham, MA (US)

( * ) Notice: Subject to any disclaimer, the term of this patent is extended or adjusted under 35 U.S.C. 154(b) by 298 days.

(21) Appl. No.: 16/220,272

(22) Filed: Dec. 14, 2018

(65) Prior Publication Data

US 2020/0191188 A1 Jun. 18, 2020

(51) Int. Cl.
| | | |
|---|---|---|
| *F16B 21/12* | (2006.01) | |
| *F16B 21/08* | (2006.01) | |
| *F16B 21/09* | (2006.01) | |
| *E05B 15/00* | (2006.01) | |
| *F16B 21/14* | (2006.01) | |

(52) U.S. Cl.
CPC ............ *F16B 21/125* (2013.01); *F16B 21/08* (2013.01); *F16B 21/09* (2013.01); *E05B 15/0093* (2013.01); *F16B 21/12* (2013.01); *F16B 2021/14* (2013.01); *F16B 2200/00* (2018.08)

(58) Field of Classification Search
CPC ........ F16B 5/0092; F16B 5/10; F16B 19/109; F16B 21/02; F16B 21/04; F16B 21/08; F16B 21/09; F16B 21/12; F16B 21/125; F16B 2021/14; F16B 2200/00; E05B 15/0093
USPC ................................ 411/347, 349, 550, 552
See application file for complete search history.

(56) References Cited

U.S. PATENT DOCUMENTS

| | | | |
|---|---|---|---|
| 3,075,208 A | | 1/1963 | Mercer et al. |
| 3,132,399 A | | 5/1964 | Cooper |
| 3,136,017 A | * | 6/1964 | Preziosi ................. F16B 21/02 |
| | | | 411/552 |
| 3,145,441 A | * | 8/1964 | Strandrud ............. F16B 19/109 |
| | | | 411/347 |
| 3,179,457 A | * | 4/1965 | Johnson ................. F16B 21/04 |
| | | | 292/195 |
| 3,207,541 A | | 9/1965 | Bartlett |

(Continued)

FOREIGN PATENT DOCUMENTS

| | | |
|---|---|---|
| CN | 1766269 A | 5/2006 |
| EP | 0381202 A1 | 8/1990 |

OTHER PUBLICATIONS

International Search Report and Written Opinion of the International Searching Authority in connection with International Patent Application No. PCT/US2019/064728 dated Mar. 30, 2020, 11 pages.

*Primary Examiner* — Roberta S Delisle

(57) ABSTRACT

An apparatus includes a housing, a spring-loaded plunger within the housing, and a spring-loaded rotating lock extending from the housing. The spring-loaded plunger includes a slot and an end portion. The end portion is configured to extend outside the housing and to be moved inward at least partially into the housing. The spring-loaded rotating lock includes a shaft, a locking pin positioned on the shaft, and a disc positioned on the shaft and having a recess. At least part of the spring-loaded plunger fits within the recess of the disc and is configured to contact the disc, and at least part of the disc fits within the slot.

20 Claims, 8 Drawing Sheets

(56) References Cited

U.S. PATENT DOCUMENTS

| | | | |
|---|---|---|---|
| 3,564,563 A * | 2/1971 | Trotter et al. | F16B 21/04 |
| | | | 411/552 |
| 4,645,373 A | 2/1987 | Purdy | |
| 4,696,596 A | 9/1987 | Russell | |
| 5,335,881 A | 8/1994 | Zaguli | |
| 5,467,619 A | 11/1995 | Stillwagon et al. | |
| 6,520,465 B1 | 2/2003 | Sack et al. | |
| 6,655,720 B2 | 12/2003 | Rampen | |
| 7,179,012 B2 | 2/2007 | Bedi | |
| 7,325,845 B2 | 2/2008 | Bartos et al. | |
| 8,186,924 B1 * | 5/2012 | Espinosa | E04B 1/2604 |
| | | | 411/536 |
| 8,397,405 B2 | 3/2013 | Harder et al. | |
| 8,801,453 B1 | 8/2014 | Scorzelli et al. | |
| 8,939,691 B2 * | 1/2015 | Tseng | F16B 21/04 |
| | | | 411/347 |
| 9,023,177 B2 * | 5/2015 | Hardin | C23C 16/4401 |
| | | | 156/345.34 |
| 9,169,863 B2 | 10/2015 | Seshachalam et al. | |
| 9,441,653 B2 * | 9/2016 | Wang | F16B 5/00 |
| 9,506,281 B1 | 11/2016 | Zaloom | |
| 9,625,796 B2 | 4/2017 | Priest et al. | |
| 9,740,245 B2 | 8/2017 | Gault et al. | |
| 9,850,641 B2 | 12/2017 | Hughes | |
| 9,903,137 B2 | 2/2018 | Min et al. | |
| 2002/0159860 A1 | 8/2002 | Kienzler | |
| 2002/0171249 A1 | 11/2002 | Daoud et al. | |
| 2003/0185653 A1 * | 10/2003 | Csik | F16B 5/10 |
| | | | 411/551 |
| 2004/0079719 A1 | 4/2004 | Weaver et al. | |
| 2007/0243042 A1 | 10/2007 | Baus | |
| 2007/0253794 A1 | 11/2007 | Zhang et al. | |
| 2008/0202069 A1 | 8/2008 | Brown | |
| 2010/0290861 A1 | 11/2010 | Wang | |
| 2011/0027012 A1 | 2/2011 | Stahle | |
| 2011/0079057 A1 | 4/2011 | Frolov et al. | |
| 2011/0255914 A1 | 10/2011 | Bynum | |
| 2012/0093347 A1 | 4/2012 | Adamson et al. | |
| 2013/0183086 A1 * | 7/2013 | Wang | F16B 5/0642 |
| | | | 403/327 |
| 2013/0259592 A1 | 10/2013 | Tiefenbock | |
| 2015/0223898 A1 | 8/2015 | Merlo et al. | |
| 2015/0323853 A1 | 11/2015 | Priest et al. | |
| 2016/0047408 A1 | 2/2016 | Stock | |
| 2017/0036260 A1 | 2/2017 | Grosche | |
| 2017/0152978 A1 | 6/2017 | Leeth et al. | |
| 2018/0029518 A1 | 2/2018 | Llewellyn et al. | |
| 2018/0044894 A1 | 2/2018 | Tuto et al. | |

* cited by examiner

WEIGHT-TRIGGERED LOCKING FEATURE

TECHNICAL FIELD

This disclosure generally relates to locking and attachment devices. More specifically, this disclosure relates to a weight-triggered locking feature.

BACKGROUND

There are numerous situations in which two or more components need to be physically fastened or otherwise secured together for at least some amount of time. For example, an electronic device or other device may need to be temporarily secured to a cart, table, or other structure for transport, testing, or other purposes. Often times, locking pins are used to temporarily secure components together. However, commercially-available locking pins typically do not provide adequate reliability when securing components together. For instance, a typical ball-lock pin having a diameter of 0.375 inches (0.9525 centimeters) may provide only about 0.065 inches (0.1651 centimeters) of locking surface and typically requires close operator attention to ensure that the ball-lock pin is installed properly.

SUMMARY

This disclosure provides a weight-triggered locking feature for securing components together.

In a first embodiment, an apparatus includes a housing, a spring-loaded plunger within the housing, and a spring-loaded rotating lock extending from the housing. The spring-loaded plunger includes a slot and an end portion. The end portion is configured to extend outside the housing and to be moved inward at least partially into the housing. The spring-loaded rotating lock includes a shaft, a locking pin positioned on the shaft, and a disc positioned on the shaft and having a recess. At least part of the spring-loaded plunger fits within the recess of the disc and is configured to contact the disc, and at least part of the disc fits within the slot.

In a second embodiment, a system includes a first component having a first mating surface, a second component having a second mating surface, and a locking feature configured to secure the first and second components together along the mating surfaces. The locking feature includes a housing, a spring-loaded plunger within the housing, and a spring-loaded rotating lock extending from the housing. The spring-loaded plunger includes a slot and an end portion. The end portion is configured to extend outside the housing and to be moved inward at least partially into the housing. The spring-loaded rotating lock includes a shaft, a locking pin positioned on the shaft, and a disc positioned on the shaft and having a recess. At least part of the spring-loaded plunger fits within the recess of the disc and is configured to contact the disc, and at least part of the disc fits within the slot.

In a third embodiment, a method of using a locking feature having a housing, a spring-loaded plunger, and a spring-loaded rotating lock includes inserting a locking pin on a shaft of the spring-loaded rotating lock through at least one opening in at least one of multiple components being secured together while preventing rotation of the spring-loaded rotating lock. The method also includes moving an end portion of the spring-loaded plunger that extends from the housing at least partially back into the housing. The method further includes, in response to movement of the spring-loaded plunger, aligning a slot of the spring-loaded plunger and a disc of the spring-loaded rotating lock, the disc having a recess. In addition, the method includes automatically rotating the disc of the spring-loaded rotating lock within the aligned slot. At least part of the spring-loaded plunger fits within the recess of the disc and is configured to contact the disc to prevent the rotation of the spring-loaded rotating lock. At least part of the disc fits within the aligned slot to permit the automatic rotation of the disc.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
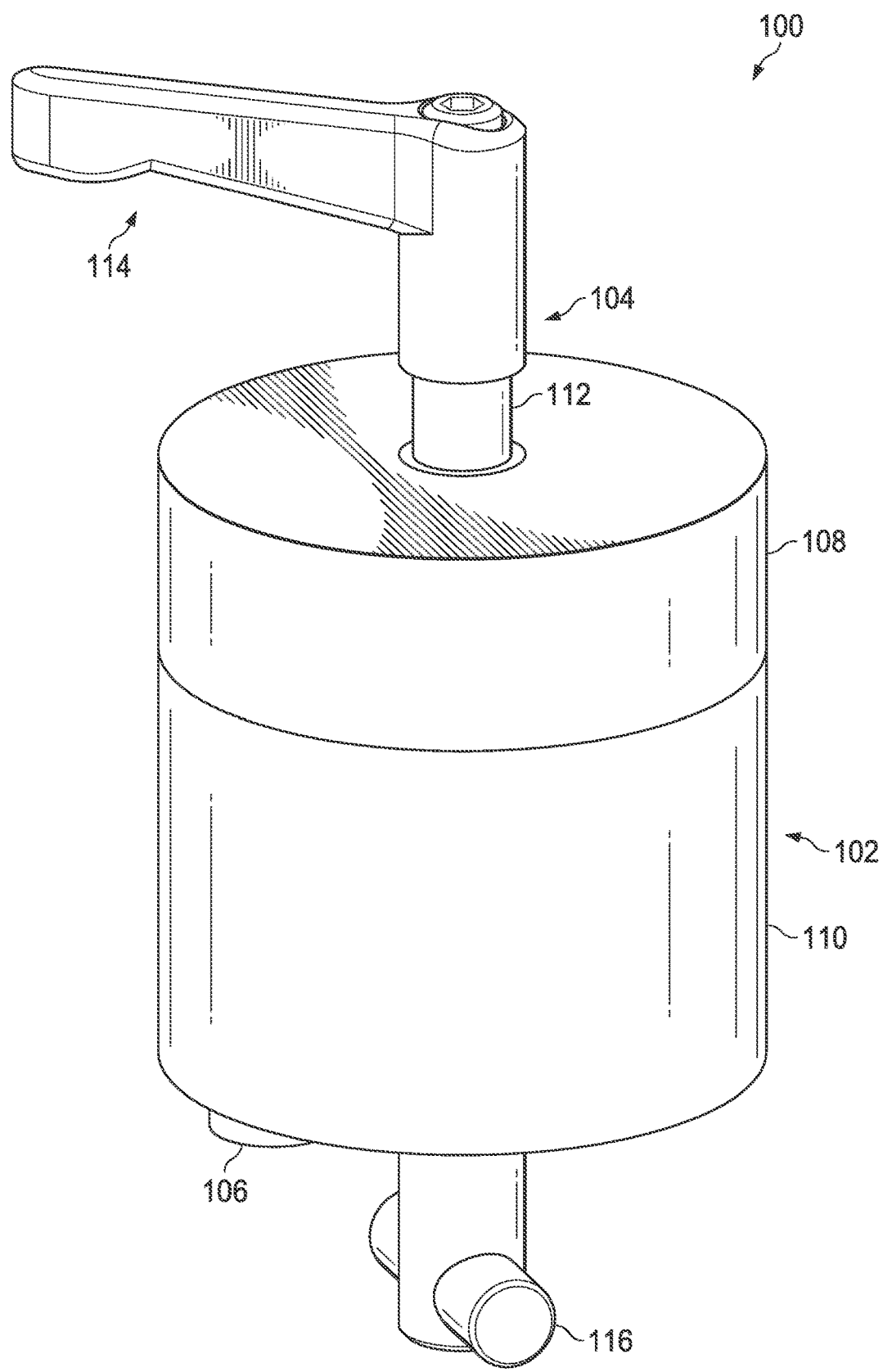
FIGS. 1 and 2 illustrate an example weight-triggered locking feature in accordance with this disclosure.

FIGS. 1 through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, there are numerous situations in which two or more components need to be physically fastened or otherwise secured together for at least some amount of time. While locking pins may be used to temporarily secure components together, commercially-available locking pins often do not provide adequate reliability when securing the components together. This can be problematic in critical applications or other applications in which it may be important or essential to ensure that components are secured together reliably. For example, when transporting imaging components or other components used in satellites, rockets, missiles, or other devices, it may be extremely important to ensure that the components are secured to transport carts before the transport carts are moved.

This disclosure provides weight-triggered locking features that enable components to be secured together easily and reliably. Among other things, a weight-triggered locking feature includes a housing, a spring-loaded rotating lock passing through the housing, and a spring-loaded plunger located primarily within the housing. A portion of the spring-loaded rotating lock can be inserted through slots or other openings of at least two components being secured together. Prior to installation of the locking feature, part of the spring-loaded plunger extends outside the housing and prevents the rotating lock from turning. After the portion of the rotating lock is inserted through the openings of the components being secured together, the spring-loaded plunger can be pushed substantially or completely inside the housing, such as due to the weight of the locking feature itself. This triggers the spring-loaded rotating lock and allows the rotating lock to partially rotate, such as by about 90°. This secures the components together and prevents the components from being separated (or prevents the components from being separated by more than some small amount). To separate the components, a handle of the rotating lock can be turned in the opposite direction, and the locking feature can be lifted to allow the spring-loaded plunger to extend partially out of the housing again and prevent the rotating lock from rotating.

In this way, the locking feature essentially provides for "error-proof" installation since an operator does not need to turn a lock or perform other tasks to ensure that components are secured together. Instead, an operator may simply need to ensure that the portion of the rotating lock is properly inserted through openings of components being secured together. The weight of the locking feature itself (or some component coupled to the locking feature) can then ensure that the spring-loaded plunger moves inward, triggering rotation of the rotating lock. This approach differs significantly from commercial lock pins through the utilization of several unique features, such as the use of the automatic rotation of the lock and the use of slotted openings in components being secured together. This approach can easily be extended to support the use of the locking feature with any suitable components and any suitable number of components. It is also possible to integrate one or more locking features into one or more of the components being secured together.

Figure 2:
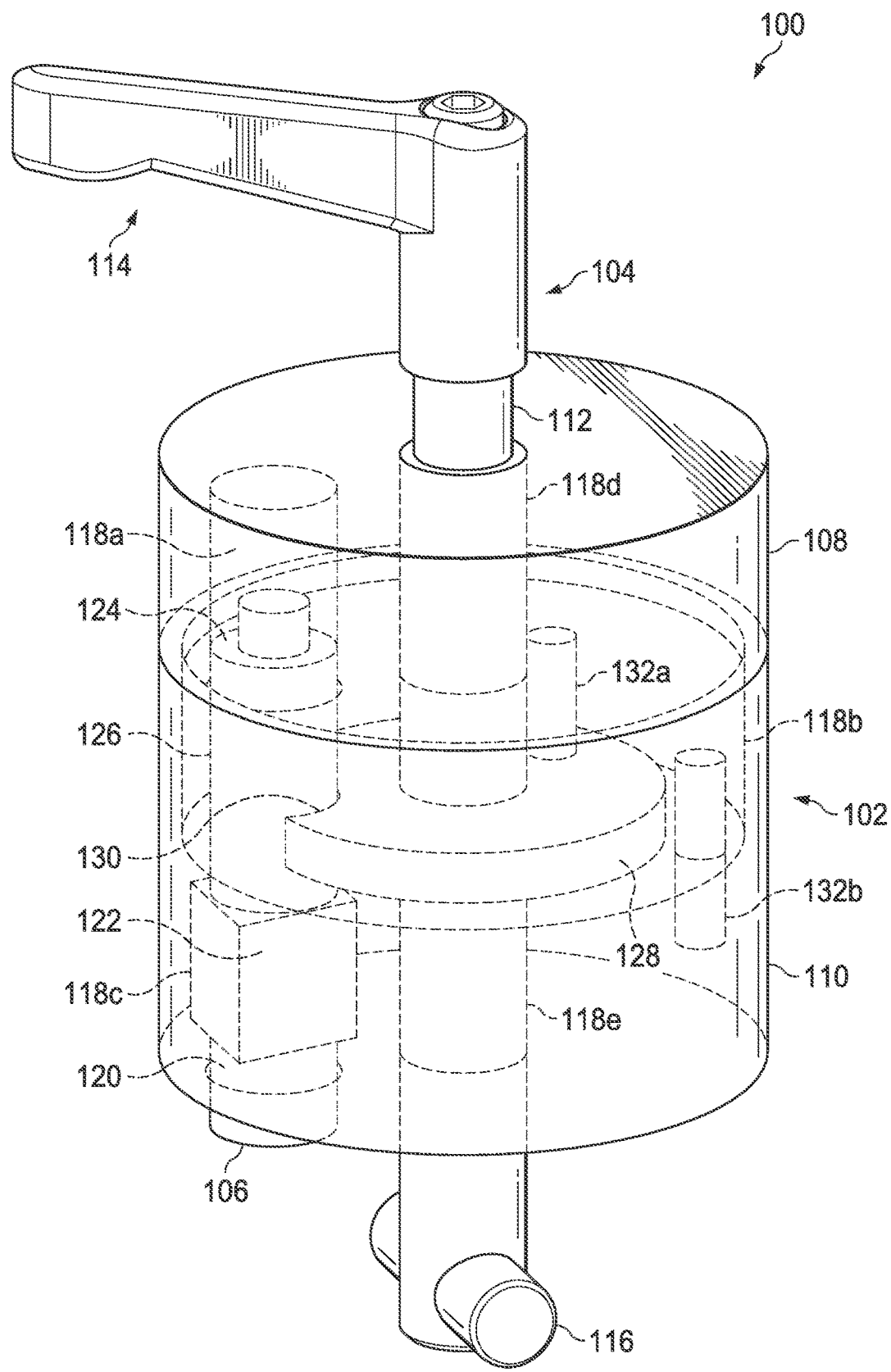

FIGS. 1 and 2 illustrate an example weight-triggered locking feature 100 in accordance with this disclosure. In particular, FIG. 1 illustrates an external view of the example locking feature 100, and FIG. 2 illustrates an internal view of the example locking feature 100.

As shown in FIG. 1, the locking feature 100 includes a housing 102, a spring-loaded rotating lock 104, and a spring-loaded plunger 106 (only a small part of which is visible in FIG. 1). The housing 102 generally represents a structure that contains part of the rotating lock 104 and at least part of the spring-loaded plunger 106. The housing 102 also allows partial rotation of the rotating lock 104 and movement of the spring-loaded plunger 106 within the housing 102.

The housing 102 can have any suitable size, shape, and dimensions. In this example, the housing 102 is generally cylindrical, although other shapes can be used. Also, the housing 102 can be formed from any suitable material(s). For instance, the housing 102 can be formed from metal or ruggedized plastic. In addition, the housing 102 can be formed in any suitable manner. In this example, the housing 102 is formed using an upper portion 108 and a lower portion 110 that can be attached together, such as via welding, bonding, threading, or other suitable technique. The use of the multiple portions 108 and 110 allows parts of the rotating lock 104 and the spring-loaded plunger 106 to be placed within the housing 102.

The rotating lock 104 includes a shaft 112 that extends through the housing 102 such that an upper portion of the shaft 112 in FIG. 1 is above the housing 102 and a lower portion of the shaft 112 in FIG. 1 is below the housing 102. A handle 114 is positioned at a first end of the shaft 112, and a locking pin 116 is positioned at a second end of the shaft 112 opposite the first end. The shaft 112 therefore couples the handle 114 and the locking pin 116 such that rotation of the handle 114 also results in corresponding rotation of the handle 114. As described in more detail below, the rotating lock 104 is spring-loaded, and the shaft 112 includes or is coupled to a disc or other structure within the housing 102. When the spring-loaded plunger 106 is pushed inward into the housing 102 (upward in FIG. 1), the spring-loading turns the shaft 112 (such as by about 90°) when the disc aligns with a slot of the plunger 106, which also turns the handle 114 and the locking pin 116 (such as by about 90°).

The rotating lock 104 can be formed from any suitable material(s). For example, the shaft 112, the handle 114, and the locking pin 116 of the rotating lock 104 can each be formed from metal or ruggedized plastic. Also, the rotating lock 104 can be formed in any suitable manner. For instance, the shaft 112 can be welded, bonded, threaded, or otherwise secured to the handle 114, and the locking pin 116 can be inserted through a hole or a threaded hole in the shaft 112. Of course, the rotating lock 104 can be formed in any other suitable manner. In addition, the rotating lock 104 can have any suitable size, shape, and dimensions. In this example, the shaft 112 and the locking pin 116 are generally cylindrical, and the handle 114 extends from the shaft 112 at an angle and has an indentation along one side to support grasping of the handle 114. However, each of the shaft 112, the handle 114, and the locking pin 116 can have any other suitable design.

A small portion of the spring-loaded plunger 106 can be seen extending from the housing 102 in FIG. 1. When the locking feature 100 is not in use, the spring-loading pushes this portion of the plunger 106 out of the housing 102. As described below, in this operational state, the spring-loaded plunger 106 substantially or completely prevents the rotating lock 104 from turning. However, when in use, the spring-loaded plunger 106 moves completely or substantially within the housing 102, such as due to the weight of the locking feature 100. This allows the rotating lock 104 to automatically turn and secure at least two components together.

As shown in FIG. 2, the spring-loaded plunger 106 fits in a space 118a within the upper portion 108 of the housing 102 and in spaces 118b and 118c within the lower portion 110 of the housing 102. Part of the plunger 106 can also pass through a bottom surface of the housing 102. Also, the shaft 112 passes through a top surface of the housing 102, through a space 118d within the upper portion 108 of the housing 102, through spaces 118b and 118e within the lower portion 110 of the housing 102, and through the bottom surface of the housing 102.

A lower portion 120 of the plunger 106 is sized and shaped to fit within and pass through an opening in the bottom surface of the housing 102. A stop portion 122 of the plunger 106 is sized and shaped to not fit within or pass through the opening in the bottom surface of the housing 102, thereby limiting the amount of downward movement by the plunger 106. A spring retention portion 124 of the plunger 106 engages with a spring (omitted here for clarity) that is inserted above the plunger 106 within the space 118a. The spring can push the plunger 106 until the stop portion 122 prevents further movement of the plunger 106, in which case the lower portion 120 of the plunger 106 is substantially outside the housing 102. However, the spring allows the lower portion 120 of the plunger 106 to be pushed substantially or completely into the housing 102 during use.

An engagement portion 126 of the plunger 106 can be used to engage a disc 128 that is part of or attached to the shaft 112 of the rotating lock 104 at some location between the ends of the shaft 112. For example, at least part of the plunger 106 (such as part of the engagement portion 126) can fit within a recess 130 of the disc 128. In one operational state (referred to as an "unsecured" state), the plunger 106 is pushed downward to its maximum extent, and the disc 128 contacts one or more sides of the engagement portion 126 of the plunger 106. In this state, the handle 114 cannot turn, and the locking pin 116 cannot rotate. While in this state, the locking feature 100 can be manipulated by an operator, such as to insert the locking pin 116 and the lower portion of the shaft 112 through openings of components to be secured together. In another operational state (referred to as a "secured" state), the plunger 106 has been pushed substantially or completely into the housing 102, which allows a slot in the engagement portion 126 (described below) to align with the disc 128. Because the rotating lock 104 is spring-loaded and at least part of the disc 128 fits within the slot, the alignment of the disc 128 with the slot in the plunger 106 allows the rotating lock 104 to turn. In this state, the handle 114 and the locking pin 116 can both be rotated automatically, such as by about 90°. While in this state, the spring-loading of the rotating lock 104 can help to keep the locking pin 116 at an angle (such as about 90° or some other angle) with respect to the openings of the components, securing those components together.

The spring-loaded plunger 106 can be formed from any suitable material(s). For example, the spring-loaded plunger 106 can be formed from metal or ruggedized plastic. Also, the spring-loaded plunger 106 can be formed in any suitable manner. For instance, the spring-loaded plunger 106 can be formed by using a mold or by machining a larger piece of material. In addition, the spring-loaded plunger 106 can have any suitable size, shape, and dimensions. While certain portions of the plunger 106 here are shown as having cylindrical and rectangular prism shapes of certain sizes, any other suitable sizes and shapes can be used here.

The disc 128 can be formed from any suitable material(s). For example, the disc 128 can be formed from metal or ruggedized plastic. Also, the disc 128 can be formed in any suitable manner. For instance, the disc 128 can be formed by using a mold or by machining a larger piece of material, or the disc 128 can be formed as an integrated part of the rotating lock 104. In addition, the disc 128 can have any suitable size, shape, and dimensions. In this example, while the disc 128 is shown as being generally cylindrical and having a curved recess 130, any other suitable sizes and shapes can be used here.

In this example embodiment, the disc 128 and two spring stops 132a-132b are located in the space 118b within the lower portion 110 of the housing 102. One spring stop 132a is positioned on the disc 128, and another spring stop 132b is embedded within the lower portion 110 of the housing 102. The spring stops 132a-132b are used with a spring (omitted here for clarity) to provide the spring-loading for the rotating lock 104. For example, when in the unsecured state, the spring stops 132a-132b are close together, and the associated spring cannot push the spring stops 132a-132b apart since the disc 128 contacts the side(s) of the plunger 106. When the slot of the plunger 106 aligns with the disc 128 upon entering the secured state, the spring pushes the spring stops 132a-132b farther apart, thereby providing rotation to the rotating lock 104. Each spring stop 132a-132b can be formed from any suitable material(s) and in any suitable manner. Each spring stop 132a-132b can also have any suitable size, shape, and dimensions. Note that while the spring stops 132a-132b are shown here as being discrete components, the spring stop 132a may represent a projection or other portion of the disc 128 itself, and the spring stop 132b may represent a projection or other portion of the housing 102 itself.

Although FIGS. 1 and 2 illustrate one example of a weight-triggered locking feature 100, various changes may be made to FIGS. 1 and 2. For example, the overall form factor of the locking feature 100 and the form factors of the various elements in the locking feature 100 can vary as needed or desired. Also, the locking feature 100 may itself be incorporated into one of the components being secured together, in which case the housing 102 may represent or be replaced by some portion of that component.

Figure 3A:
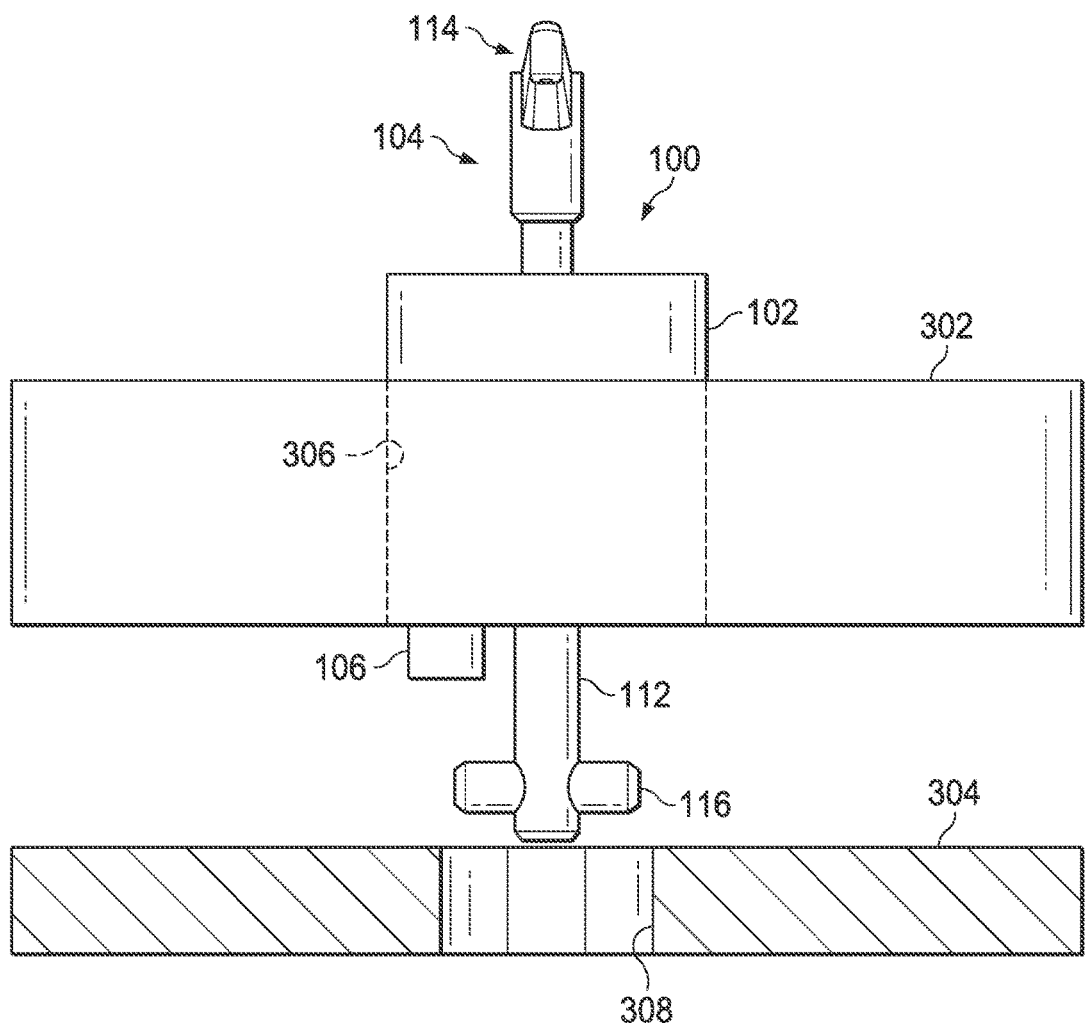
FIGS. 3A through 3C illustrate a first example operational state of a weight-triggered locking feature in accordance with this disclosure.
Figure 3B:
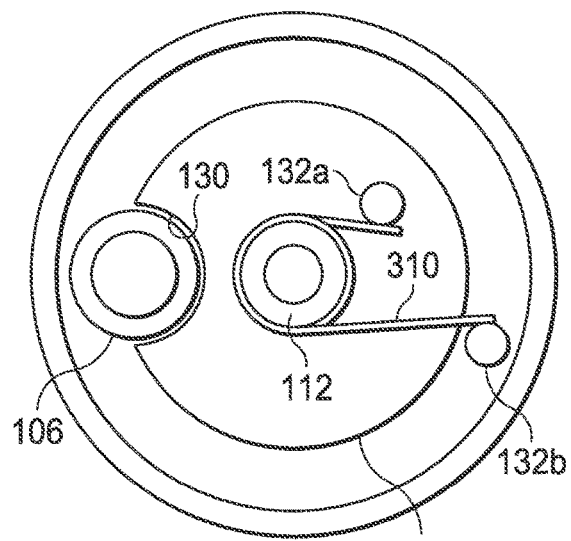
Figure 3C:
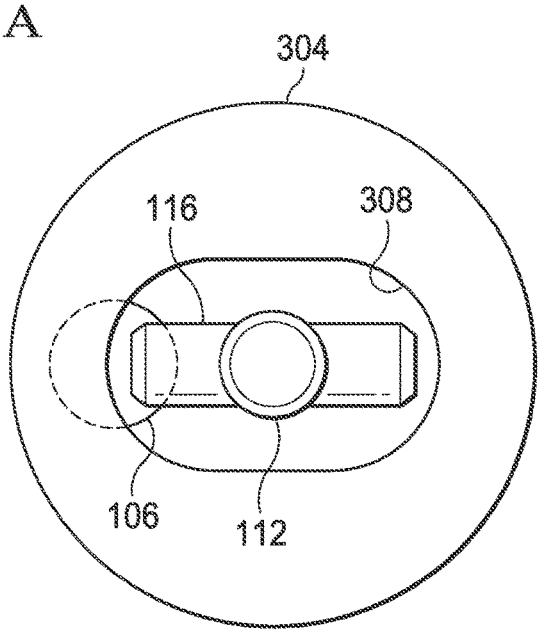
Figure 4A:
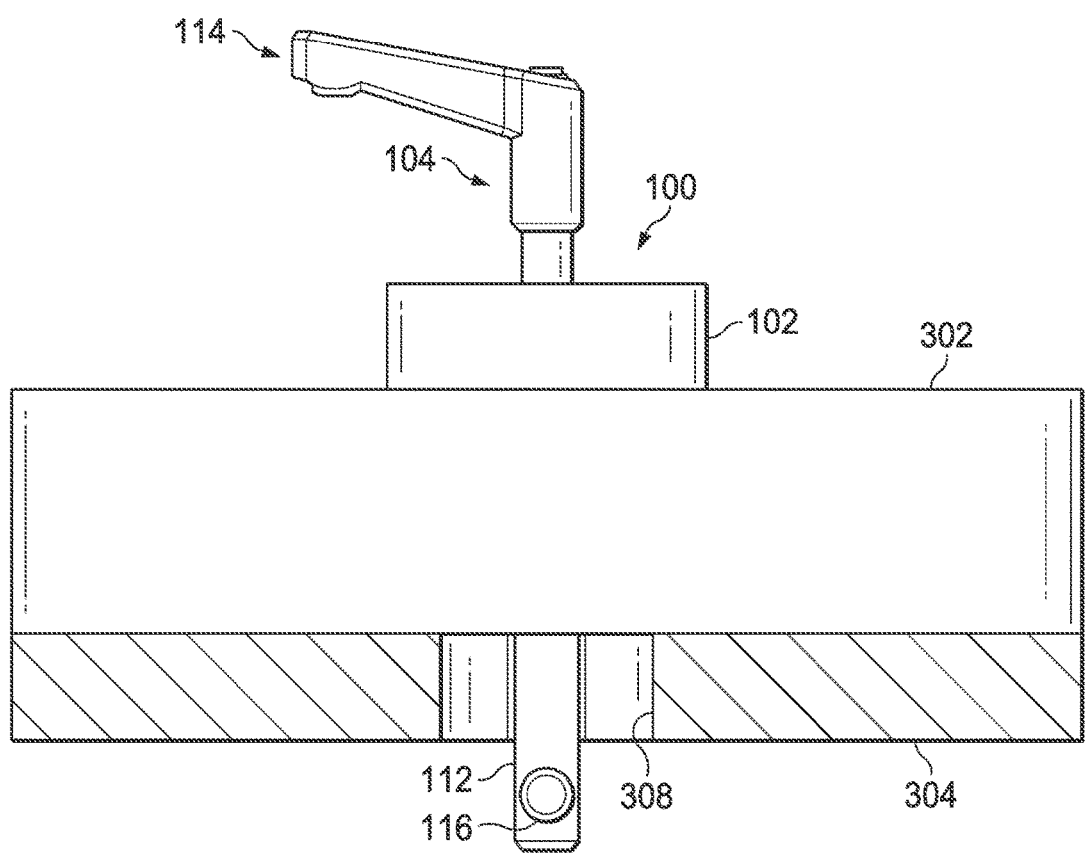
FIGS. 4A through 4C illustrate a second example operational state of a weight-triggered locking feature in accordance with this disclosure.
Figure 4B:
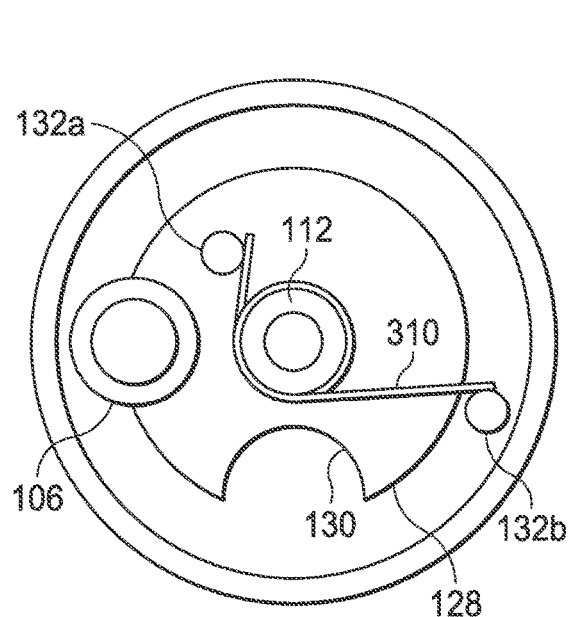
Figure 4C:
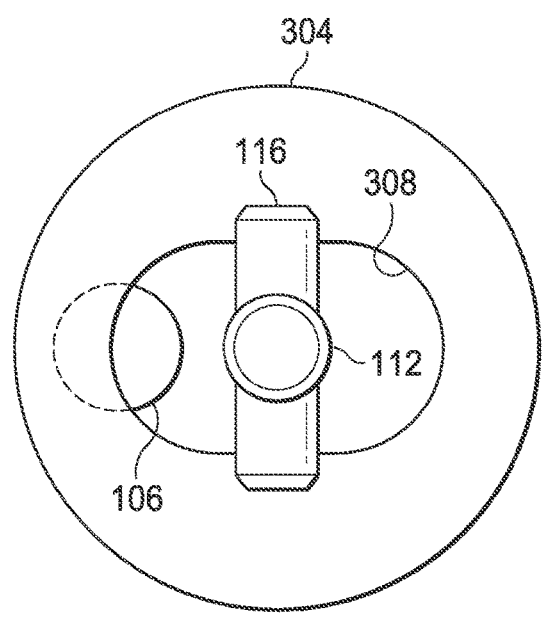

FIGS. 3A through 3C illustrate a first example operational state of a weight-triggered locking feature in accordance with this disclosure, and FIGS. 4A through 4C illustrate a second example operational state of a weight-triggered locking feature in accordance with this disclosure. In particular, FIGS. 3A through 3C illustrate an unsecured operational state of the weight-triggered locking feature, and FIGS. 4A through 4C illustrate a secured operational state of the weight-triggered locking feature. For ease of explanation, the operational states shown in FIGS. 3A through 4C are described as involving the use of the locking feature 100 shown in FIGS. 1 and 2. However, any other suitable locking features designed in accordance with this disclosure can be used here.

As shown in FIGS. 3A through 3C, the locking feature 100 is being used to secure two mating surfaces 302 and 304, which represent portions of different components being secured together. In this example, the mating surface 302 includes a recess 306 into which at least part of the housing 102 can be inserted. One or more openings along the bottom of the mating surface 302 allow the lower portions of the plunger 106 and the shaft 112 to extend below the mating surface 302. Either the recess 306 or the opening(s) along the bottom of the mating surface 302 can be used to help retain the housing 102, thereby preventing the housing 102 from passing completely through the mating surface 302. Here, the locking pin 116 and the lower end of the shaft 112 are also being inserted through an opening 308 of the mating surface 304. The opening 308 here generally has an oval, elliptical, or elongated shape, although any other suitable regular or irregular shape can be used.

As can be seen in FIGS. 3A through 3C, the locking feature 100 is in the unsecured state since part of the plunger 106 still extends outside the housing 102. In this state, the recess 130 of the disc 128 contacts the plunger 106, substantially or completely preventing rotation of the disc 128 and therefore substantially or completely preventing rotation of the shaft 112, handle 114, and locking pin 116. A torsion spring 310 is positioned above the disc 128 and wraps around the shaft 112 in this example. The torsion spring 310 contacts both spring stops 132a-132b and generally operates to apply forces to the spring stops 132a-132b in opposite rotational directions. In the unsecured state, the spring stops 132a-132b are close together, and the torsion spring 310 is attempting to push the spring stops 132a-132b apart but cannot due to the disc 128 contacting the plunger 106.

As shown in FIGS. 4A through 4C, the locking feature 100 is now in the secured state since the plunger 106 has been depressed. As a result, a slot of the plunger 106 has aligned with the disc 128, allowing the torsion spring 310 to push the spring stops 132a-132b farther apart. Thus, the disc 128 rotates by some specified amount (such as about 90° or some other angle), also rotating the locking pin 116 by the same amount. Since the opening 308 here has an elongated shape, rotating the locking pin 116 causes the locking pin 116 to be oriented lengthwise at a different angle (possibly perpendicular) to the lengthwise orientation of the opening 308. Because of this, the locking pin 116 cannot be removed through the opening 308, which helps to secure the mating surfaces 302 and 304 together. Moreover, the torsion spring 310 can help to reduce or prevent the likelihood that the rotating lock 104 would rotate to allow the locking pin 116 to pass through the opening 308 again, at least until an operator manually turns the handle 114 in order to separate the mating surfaces 302 and 304.

Figure 5:
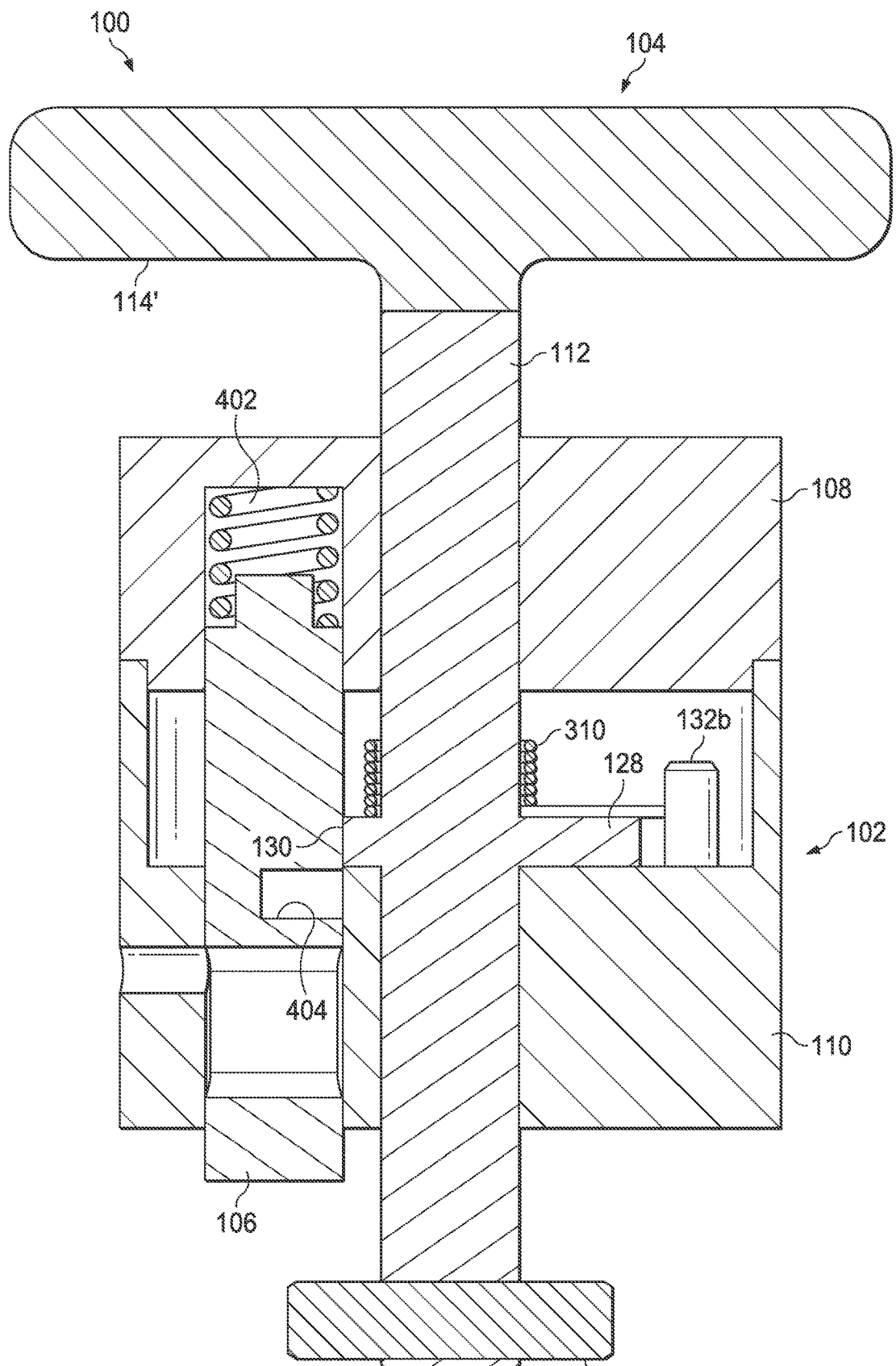
FIGS. 5 and 6 illustrate example internal operations within a weight-triggered locking feature in accordance with this disclosure.
Figure 6:
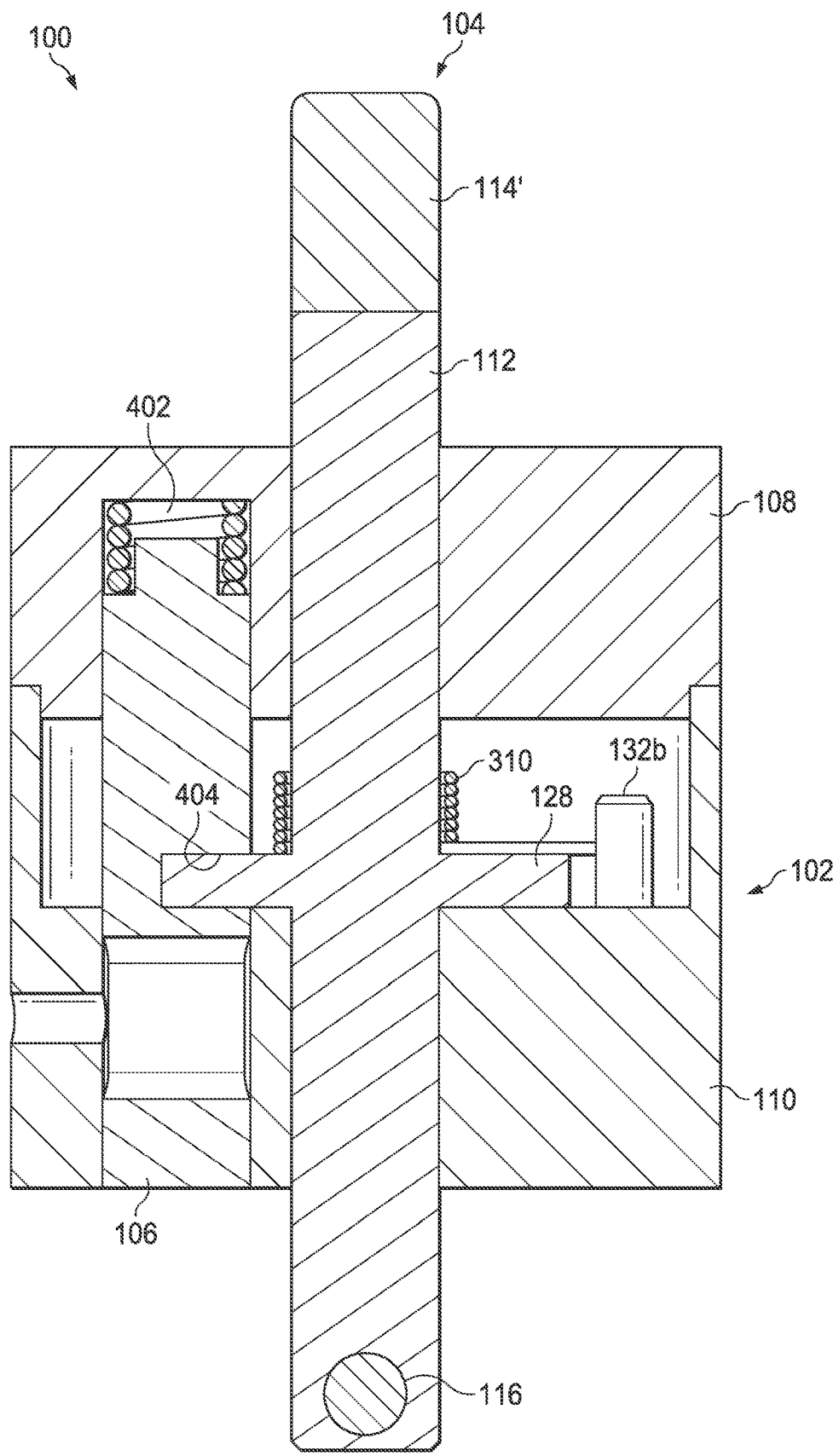

FIGS. 5 and 6 illustrate example internal operations within a weight-triggered locking feature in accordance with this disclosure. In particular, FIGS. 5 and 6 illustrate example cross-sections of the locking feature 100 when the locking feature 100 is in the operational states shown in FIGS. 3A through 3C and FIGS. 4A through 4C, respectively. For ease of explanation, the internal operations shown in FIGS. 5 and 6 are described as involving the use of the locking feature 100 shown in FIGS. 1 and 2. However, any other suitable locking features designed in accordance with this disclosure can be used here. Note that a handle 114' has a different design in FIGS. 5 and 6 compared to the handle 114 shown in FIGS. 1 through 4C, although the same handle or other handles can be used in the locking feature 100.

As shown in FIG. 5, the locking feature 100 is in the unsecured state, so the lower portion of the plunger 106 extends outside the lower portion 110 of the housing 102. This is because a compression spring 402 is positioned above the plunger 106 and is pushing the plunger 106 downward. However, as described above, the stop portion 122 of the plunger 106 limits movement of the plunger 106 caused by the spring 402, which prevents the plunger 106 from exiting the housing 102. Also, a slot 404 of the plunger 106 is positioned below the disc 128 in this example, so the recess 130 of the disc 128 is currently positioned partially around the plunger 106. This substantially or completely prevents the rotating lock 104 from turning. Note that the slot 404 here extends about 50%-60% through the plunger 106, although other designs for the slot 404 can be used.

As shown in FIG. 6, the locking feature 100 is in the secured state since the plunger 106 has been depressed and is now entirely or substantially within the housing 102. The compression spring 402 positioned above the plunger 106 allows this movement of the plunger 106 and is trying to push the plunger 106 downward, but the presence of the mating surface 304 can prevent that. Also, the slot 404 of the plunger 106 is now aligned with the disc 128. Because at least part of the disc 128 fits within the slot 404, this allows the torsion spring 310 to rotate the disc 128 (and therefore rotate the entire rotating lock 104).

This design for the locking feature 100 therefore provides an innovative mechanism for securing two or more components together. Among other things, the locking feature 100 uses the spring-loaded plunger 106 to retain the locking feature 100 in the unsecured state, and the locking feature 100 is only activated (enters the secured state) during installation when the spring-loaded plunger 106 is depressed. Also, activation of the locking feature 100 is accomplished physically using a combination of the spring-loaded plunger 106 and the rotating lock 104 (which is loaded by the torsion spring 310). Further, one or more mating surfaces can use a slotted opening or other elongated opening to help hold the locking pin 116 in place, and the locking pin 116 can rotate by a suitable amount to help ensure that robust locking is achieved. Moreover, various parameters of the locking feature 100 (such as the contact area of the housing 102, the length of the plunger 106, the length of the shaft 112, or the size of the locking pin 116) can be easily tailored for specific applications.

In addition, the design of the locking feature 100 can support error-proof installation since the locking feature 100 would typically remain in the unsecured state until triggered by depression of the plunger 106, at which point the locking feature 100 automatically rotates the rotating lock 104 and enters the secure state. Ideally, this guarantees that the locking feature 100 is activated automatically once two or more mating surfaces are brought together, reducing or eliminating the likelihood that the mating surfaces are not secured together. During removal of the locking feature 100, the handle 114 can be turned and the locking feature 100 can be lifted, at which point the plunger 106 extends again and automatically resets the locking feature 100 into the unsecured state. By reducing errors in the coupling of multiple components together, damage or other risks to the components can be reduced. Based on these operations, the locking feature 100 can be said to represent an "oscillating" locking feature since it may generally be transitioned between these two operational states during use and typically does not remain in another operational state for any significant length of time.

Although FIGS. 3A through 6 illustrate examples of operational states and internal operations within a weight-triggered locking feature 100, various changes may be made to FIGS. 3A through 6. For example, the relative sizes, shapes, and dimensions of the elements of the locking feature 100 can vary as needed or desired, and various elements can be repositioned within the locking feature 100. Also, the locking feature 100 may itself be incorporated into one of the mating surfaces 302 and 304. In addition, the locking feature 100 can be used to secure any suitable number of components, and each of those components can have any suitable design. In general, the component closest to the locking pin 116 can have an elongated or other opening suitable for retention of the locking pin 116 when the locking feature 100 is in the secured state. The other components may (but need not) include elongated or other openings suitable for retaining the locking pin 116.

Figure 7A:
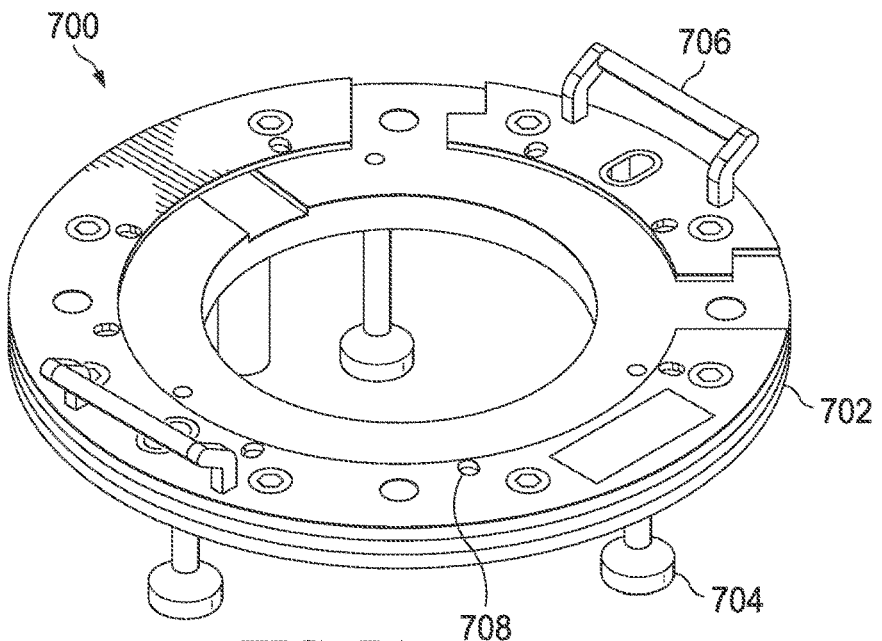
FIGS. 7A and 7B illustrate an example use of a weight-triggered locking feature in accordance with this disclosure.
Figure 7B:
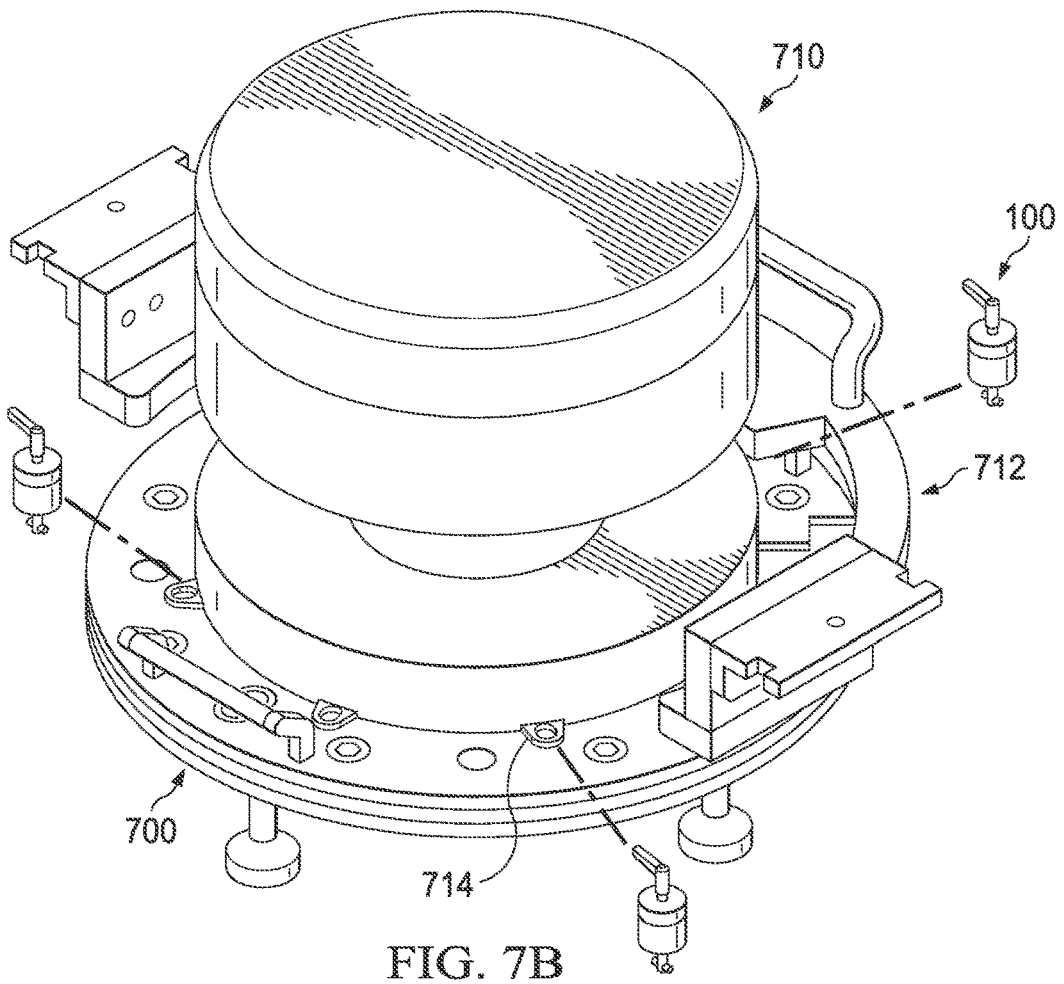

FIGS. 7A and 7B illustrate an example use of a weight-triggered locking feature in accordance with this disclosure. For ease of explanation, the example use shown in FIGS. 7A and 7B is described as involving the use of one or more instances of the locking feature 100 shown in FIGS. 1 and 2. However, any other suitable locking features designed in accordance with this disclosure can be used here, and the locking feature 100 shown in FIGS. 1 and 2 can be used in any other suitable manner.

As shown in FIG. 7A, a test ring 700 includes a generally circular or annular support 702 resting on multiple legs 704. Handles 706 are provided for lifting and transport of the test ring 700. The support 702 of the test ring 700 has various openings and other features, including elongated or other openings 708. As shown in FIG. 7B, a device under test 710 (which may sometimes be referred to as a "DUT") has been placed on the test ring 700. The device under test 710 may represent any suitable device to be tested while the device is positioned on the test ring 700. For example, the device under test 710 may represent an imaging system, such as an infrared camera system or other camera system, used in satellites, rockets, or other flight or space vehicles. The test ring 700 is opened in the middle, allowing the imaging system to be placed camera-side down on the test ring 700 and tested. In some cases, the test ring 700 may be designed to provide specific protection or movement to the device under test 710 during the testing, such as when the test ring 700 is designed to provide a desired vibration profile during the testing.

One or more instances of the locking feature 100 can be used here to secure the device under test 710 to the test ring 700. For example, the locking pin 116 of each locking feature 100 can be inserted through a flange or other coupler 714 of the device under test 710 and then through an opening 708 of the test ring 700. Once the plunger 106 of each locking feature 100 contacts the test ring 700, the locking feature 100 is triggered and rotates its locking pin 116, helping to secure the device under test 710 to the test ring 700. If needed or desired, a lifting bracket 712 can be secured to the test ring 700 before or after the device under test 710 has been placed on the test ring 700. The lifting bracket 712 may allow a forklift, robotic arm, or other system to lift the test ring 700 with the device under test 710. Once moved to a desired position, the handle 114 of each locking feature 100 can be rotated, and each locking feature 100 can be lifted to remove its locking pin 116 from the associated opening 708 of the test ring 700 and from the associated coupler 714 of the device under test 710. As a result, one or more instances of the locking feature 100 can be used to quickly and easily secure components together and then to release the components as needed.

Although FIGS. 7A and 7B illustrate one example use of a weight-triggered locking feature 100, various changes may be made to FIGS. 7A and 7B. For example, one or more instances of the locking feature 100 can be used in any other suitable manner, and the locking feature 100 can be easily scaled for use in different applications. Some example applications include securing tools, fixtures, or other components to material handling devices, such as handling rings, assembly stands, and transportation carts. Other example applications include commercial transportation, shipping, or storage operations.

Figure 8:
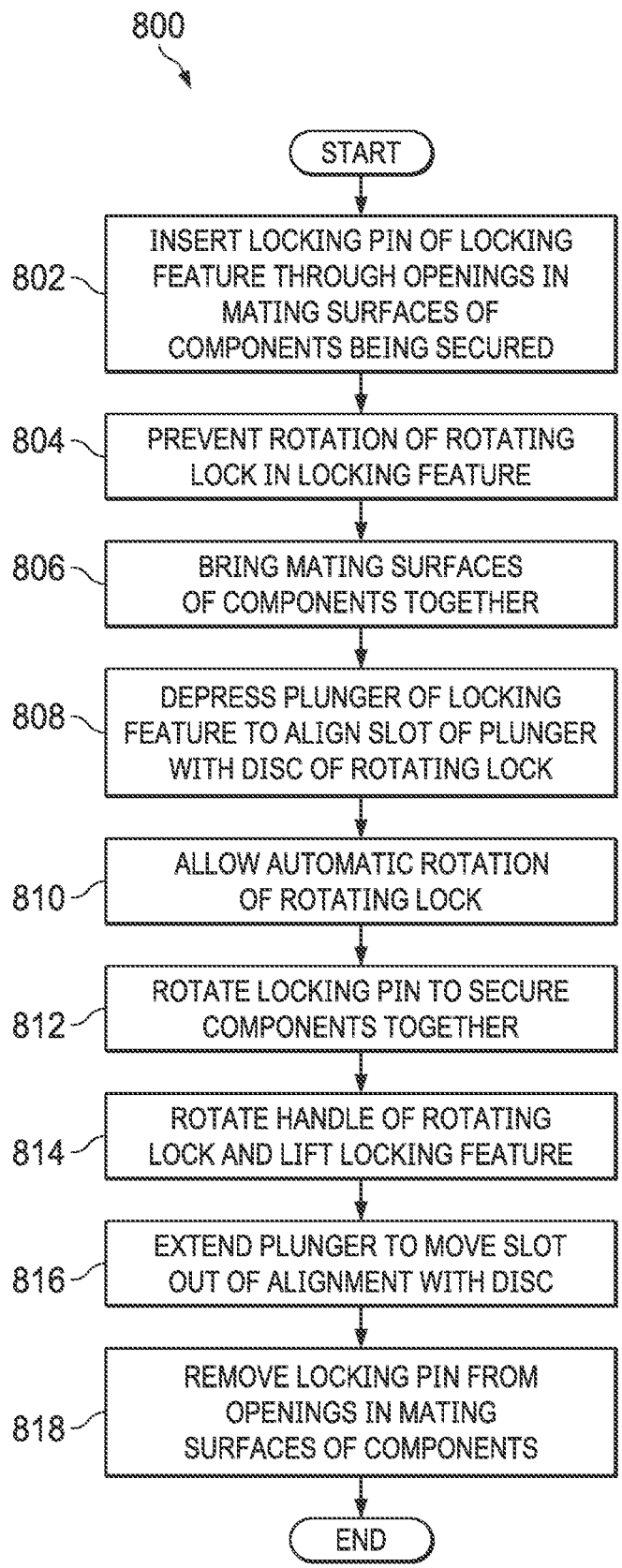
FIG. 8 illustrates an example method for securing components using a weight-triggered locking feature in accordance with this disclosure.

FIG. 8 illustrates an example method 800 for securing components using a weight-triggered locking feature in accordance with this disclosure. For ease of explanation, the method 800 shown in FIG. 8 is described as involving the use of the locking feature 100 shown in FIGS. 1 and 2 having the operational states and internal operations shown in FIGS. 3A through 6. However, the method 800 may be used with any other suitable locking features designed in accordance with this disclosure.

As shown in FIG. 8, a locking pin of a locking feature is inserted through openings in mating surfaces of components being secured at step 802. This can include, for example, an operator inserting the lower portion of the shaft 112 with the locking pin 116 through an opening in the mating surface 302 and through an opening 308 in the mating surface 304. During this time, rotation of a rotating lock (which includes the locking pin) is prevented at step 804. This can include, for example, the spring 402 pushing the lower portion 120 of the plunger 106 out of the housing 102 so that the disc 128 of the rotating lock 104 contacts the plunger 106 and cannot align with the slot 404 in the plunger 106.

The mating surfaces of the components being secured are brought together at step 806. This can include, for example, the mating surface 302 being placed onto the mating surface 304. As a result of the weight of the locking feature or of at least one of the components, the plunger of the locking feature is depressed to align the slot of the plunger with the disc of the rotating lock at step 808. This can include, for example, the plunger 106 being pressed inward into the housing 102 of the locking feature 100 so that the disc 128 of the rotating lock 104 aligns with the slot 404 in the plunger 106. Rotation of the rotating lock in the locking feature occurs automatically at step 810, which causes the locking pin to rotate and secure the components together at step 812. This can include, for example, the spring 310 pushing the spring stops 132a-132b apart, causing rotation of the disc 128 and thereby causing rotation of the rotating lock 104. This can also include the locking pin 116 rotating by a suitable amount (such as about 90° or some other angle) so that the locking pin 116 cannot move through at least the opening 308 in the mating surface 304. At this point, the components are secured together and cannot be separated (or can only be separated by some small amount as defined by the design of the locking feature 100).

If needed or desired, a handle of the locking feature can be rotated and the locking feature can be lifted at step 814. This can include, for example, an operator rotating the handle 114 or 114' of the locking feature 100, causing the locking pin 116 to also rotate. This can also include the operator lifting the locking feature 100 upward. The handle 114 or 114' here can be rotated so that the recess 130 in the disc 128 is generally aligned with the plunger 106. The plunger is extended to move the slot in the plunger out of alignment with the disc of the rotating lock at step 816. This can include, for example, the spring 402 pushing the plunger 106 downward so that the lower portion 120 of the plunger 106 moves out of the housing 102. The disc 128 of the rotating lock 104 is therefore no longer aligned with the slot 404 in the plunger 106. The locking pin of the locking feature is removed from the openings in the mating surfaces of the components at step 818. This can include, for example, the operator lifting the locking feature 100 further so that the lower portion of the shaft 112 with the locking pin 116 are removed from the opening in the mating surface 302 and from the opening 308 in the mating surface 304. At that point, the components are no longer secured by the locking feature 100, and the locking feature 100 is again in the unsecured state.

Although FIG. 8 illustrates one example of a method 800 for securing components using a weight-triggered locking feature, various changes may be made to FIG. 8. For example, while shown as a series of steps, various steps in FIG. 8 can overlap, occur in parallel, occur in a different order, or occur any number of times.

It should be noted here that the description above often assumes the locking feature 100 is positioned over two or more components being secured together. Thus, elements have often been described as being moved "upward" or "downward," as having "upper" and "lower" portions, or as having "top" and "bottom" surfaces based on the assumed positioning or orientation of the elements. However, the locking feature 100 is not required to be positioned above the components being secured. Therefore, terms implying specific directions or orientations (such as "upward," "downward," "upper," "lower," "top," and "bottom") are used above with reference to the specific orientation shown in the drawings but do not limit the use of the locking feature 100 to that specific orientation. These terms can be replaced by more generic terms, such as "first" and "second," without departing from the scope of this disclosure.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a housing;
   a spring-loaded plunger within the housing, the spring-loaded plunger comprising a slot and an end portion, the end portion configured to extend outside the housing and to be moved inward at least partially into the housing; and
   a spring-loaded rotating lock extending from the housing, the spring-loaded rotating lock comprising a shaft, a locking pin positioned on the shaft, and a disc positioned on the shaft and having a recess;
   wherein at least part of the spring-loaded plunger fits within the recess of the disc and is configured to contact the disc; and
   wherein at least part of the disc fits within the slot.

2. The apparatus of claim 1, wherein the apparatus is configured to have a first operational state in which:
   the end portion of the spring-loaded plunger extends outside the housing;
   the slot of the spring-loaded plunger is not aligned with the disc of the spring-loaded rotating lock; and
   the disc contacts one or more sides of the spring-loaded plunger to substantially prevent the spring-loaded rotating lock from rotating.

3. The apparatus of claim 2, wherein the apparatus is further configured to have a second operational state in which:
   the end portion of the spring-loaded plunger is moved inward at least partially into the housing;
   the slot of the spring-loaded plunger is aligned with the disc of the spring-loaded rotating lock; and
   the spring-loaded rotating lock is rotatable within the slot of the spring-loaded plunger.

4. The apparatus of claim 3, wherein the apparatus is configured to remain in the first operational state until movement of the spring-loaded plunger causes the apparatus to automatically enter the second operational state.

5. The apparatus of claim 1, wherein:
   the spring-loaded plunger further comprises a first spring configured to cause the end portion to extend outside the housing and to allow the end portion to be moved inward at least partially into the housing; and
   the spring-loaded rotating lock further comprises a second spring configured to cause rotation of the disc when the slot of the spring-loaded plunger is aligned with the disc.

6. The apparatus of claim 5, further comprising:
   a first spring stop positioned on the disc; and
   a second spring stop positioned within the housing;
   wherein the second spring is configured to contact the spring stops and to push the spring stops in opposite rotational directions.

7. The apparatus of claim 1, wherein the spring-loaded rotating lock further comprises a handle positioned on the shaft, the handle configured to be rotated by an operator in order to cause rotation of the disc and the locking pin.

8. A system comprising:
   a first component comprising a first mating surface;
   a second component comprising a second mating surface; and
   a locking feature configured to secure the first and second components together along the mating surfaces;
   wherein the locking feature comprises:
      a housing;
      a spring-loaded plunger within the housing, the spring-loaded plunger comprising a slot and an end portion, the end portion configured to extend outside the housing and to be moved inward at least partially into the housing; and
      a spring-loaded rotating lock extending from the housing, the spring-loaded rotating lock comprising a shaft, a locking pin positioned on the shaft, and a disc positioned on the shaft and having a recess;
   wherein at least part of the spring-loaded plunger fits within the recess of the disc and is configured to contact the disc; and
   wherein at least part of the disc fits within the slot.

9. The system of claim 8, wherein:
   at least the second mating surface comprises an elongated opening; and
   the locking pin is configured to fit through the elongated opening when the locking feature is in a first operational state and to not fit through the elongated opening when the locking feature is in a second operational state.

10. The system of claim 9, wherein the locking feature is configured to remain in the first operational state until movement of the spring-loaded plunger causes the locking feature to automatically enter the second operational state.

11. The system of claim 8, wherein the locking feature is configured to have a first operational state in which:
   the end portion of the spring-loaded plunger extends outside the housing;
   the slot of the spring-loaded plunger is not aligned with the disc of the spring-loaded rotating lock; and the disc contacts one or more sides of the spring-loaded plunger to substantially prevent the spring-loaded rotating lock from rotating.

12. The system of claim 11, wherein the locking feature is further configured to have a second operational state in which:
the end portion of the spring-loaded plunger is moved inward at least partially into the housing;
the slot of the spring-loaded plunger is aligned with the disc of the spring-loaded rotating lock; and
the spring-loaded rotating lock is rotatable within the slot of the spring-loaded plunger.

13. The system of claim 8, wherein:
the spring-loaded plunger further comprises a first spring configured to cause the end portion to extend outside the housing and to allow the end portion to be moved inward at least partially into the housing; and
the spring-loaded rotating lock further comprises a second spring configured to cause rotation of the disc when the slot of the spring-loaded plunger is aligned with the disc.

14. The system of claim 13, wherein the locking feature further comprises:
a first spring stop positioned on the disc; and
a second spring stop positioned within the housing; and
wherein the second spring is configured to contact the spring stops and to push the spring stops in opposite rotational directions.

15. The system of claim 8, wherein the spring-loaded rotating lock further comprises a handle positioned on the shaft, the handle configured to be rotated by an operator in order to cause rotation of the disc and the locking pin.

16. The system of claim 8, wherein the system comprises multiple locking features.

17. A method of using a locking feature having a housing, a spring-loaded plunger, and a spring-loaded rotating lock, the method comprising:
inserting a locking pin on a shaft of the spring-loaded rotating lock through at least one opening in at least one of multiple components being secured together while preventing rotation of the spring-loaded rotating lock;
moving an end portion of the spring-loaded plunger that extends from the housing at least partially back into the housing;
in response to movement of the spring-loaded plunger, aligning a slot of the spring-loaded plunger and a disc of the spring-loaded rotating lock, the disc having a recess; and
automatically rotating the disc of the spring-loaded rotating lock within the aligned slot;
wherein at least part of the spring-loaded plunger fits within the recess of the disc and is configured to contact the disc to prevent the rotation of the spring-loaded rotating lock; and
wherein at least part of the disc fits within the aligned slot to permit the automatic rotation of the disc.

18. The method of claim 17, wherein moving the end portion at least partially back into the housing comprises:
depressing the end portion of the spring-loaded plunger based at least partially on a weight of the locking feature.

19. The method of claim 17, wherein:
the at least one opening comprises at least one elongated opening;
the locking pin fits through the at least one elongated opening during the inserting; and
automatically rotating the disc of the spring-loaded rotating lock causes the locking pin to rotate such that the locking pin does not fit through the at least one elongated opening.

20. The method of claim 19, further comprising:
rotating a handle on the shaft of the spring-loaded rotating lock to rotate the locking pin so that the locking pin again fits through the at least one elongated opening;
lifting the housing so that the end portion of the spring-loaded plunger again extends from the housing; and
moving the slot of the spring-loaded plunger out of alignment with the disc of the spring-loaded rotating lock.

* * * * *